March 10, 1964   J. W. SEMMER ETAL   3,124,698
VOLTAGE REGULATING ARRANGEMENT
Filed Feb. 27, 1961   2 Sheets-Sheet 1

INVENTORS
Joseph W. Semmer
Frederick A. Stich
BY
Atty.

INVENTORS
Joseph W. Semmer
Frederick A. Stich
BY
C. A. Gulbrandsen
Atty.

United States Patent Office 3,124,698
Patented Mar. 10, 1964

3,124,698
VOLTAGE REGULATING ARRANGEMENT
Joseph W. Semmer and Frederick A. Stich, Chicago, Ill., assignors to Automatic Electric Laboratories, Inc., Northlake, Ill., a corporation of Delaware
Filed Feb. 27, 1961, Ser. No. 91,773
7 Claims. (Cl. 307—51)

This invention relates to a voltage regulating arrangement, and more particularly to apparatus for controlling the supply of power from a current supply source to a load of a type which may itself supply power back to its terminals, at a nominal terminal voltage.

The principal object of this invention is to provide a voltage regulating arrangement which can act as a sink to absorb power from the load, which protects the load from over-voltage, and which maintains good efficiency under all load conditions.

In many electronic systems, it is necessary to supply regulated direct-current at various points. At some points, the load at times produces direct-current power which must be absorbed by the supply source while maintaining the designated voltage value. For example, transistors acting as switching devices may each have their collector electrode connected through a resistor to a relatively high-voltage bias source, and also through a clamping diode to a lower value of direct-current bias. When the transistor is biased to cut-off, power flows from the high-voltage source to an output terminal and also through the clamping diode to the low-voltage source. This latter voltage is the desired voltage at the output terminal, and should be regulated within close limits. Also, the high-voltage bias is usualy of a value great enough to damage the transistor, and the clamping voltage is depended upon for protection. Therefore, if the clamping voltage bias source were used to supply a number of transistors, and its voltage became excessive, the result could be disastrous. This would also be the case if the clamping bias source failed and became open-circuited.

There are also other types of electronic apparatus in which a direct-current supply must at times act as a sink to absorb power from the load. The usual direct-current supply includes unidirectional devices, and therefore power cannot flow in the reverse direction.

In an electronic system of this type, it is also usually advantageous to use the same power supply as a source of power. In such an arrangement, then, the same power supply would at times be acting as a source of power and at other times as a sink.

One known arrangement for obtaining sink-source regulation is to use a basic series-regulator with an external bleeder resistor added across the output terminals. In a series-regulator, a variable resistance device, such as a vacuum tube or transistor, is connected in series between the source and the load, and the control arrangement is provided to change the resistance in response to any small change in the output voltage. Current may flow in only one direction through the regulating element, and in order to maintain a regulated output voltage, there always must be some current drawn through the regulating element from the unregulated source of direct-current power. To adapt such a series-regulator to act as a sink, the bleeder resistor must have a value such that the current drained through it is greater than the maximum expected sink current, so that the current drawn from the source never drops to zero. When sink loading is applied to the output terminals of the regulator, the sink current replaces some of the current drawn from the unregulated direct-current source. At full sink load, a small current is drawn from the direct-current power source since the sink current has replaced most of this current drawn from the direct-current source. Thus, it is clear that when there is no loading at the output terminals of the regulator considerable power will be wasted. Therefore, a series regulator with a bleeder resistor is a very inefficient sink-source regulator.

Another basic type of regulator is a shunt-regulator, in which the variable resistance device, such as a transistor, is shunted across the output terminals, and it is controlled to vary in response to any small fluctuations in the output voltage. This arrangement requires a dropping resistor connected in series between the source and the shunt device. Since the regulating element has a shunt orientation, it can accept current from sink loading. However, as a sink-source regulator, regardless of the amount of loading, the current drain from the unregulated direct-current source will be constant. This current must be sufficient to drop the input voltage to the output voltage, and this current is always larger than the maximum expected source current. The wasted power at no load will be considerable as in the case of a series-regulator, and this power will continue to be wasted for all sink loading. Therefore, for overall operation, the shunt-regulator wastes as much power as the series-regulator.

The known art also includes current-supply apparatus in which a variable resistance device is connected in series between the source and the load, and another variable resistance device is connected in shunt across the load. In that arrangement, the shunt device is controlled in accordance with the voltage fluctuations across the load, and the series device is controlled in accordance with fluctuations of the load current. However, that apparatus is designed only to act as a power source. In the load current detector, there is no way in which to detect when the arrangement is acting as a sink and also no way to control the resistance of the series device accordingly. Therefore, the apparatus could not be used as an efficient sink-source regulator.

According to the invention, a sink-source regulating arrangement which has good efficiency under all load conditions is obtained by providing an arrangement with one variable resistance device, such as a transistor, connected in series between the source and the load, and another variable resistance device, such as a transistor, connected in shunt across the load; with the resistance of the shunt device controlled in accordance with the voltage fluctuations across the load terminals, and the resistance of the series device controlled in accordance with the fluctuations of current through the shunt-regulating device. With this arrangement, the series-regulating device and the shunt-regulating device can both be made to have relatively high resistance at no load so that very little power is wasted. Under sink load conditions, the resistance of the series-regulating device is further increased, so that negligible power is drawn from the source under this condition. This reduces the current which is necessary to shunt through the shunt-regulating device during no load and sink loading conditions. Under source loading, the arrangement acts basically as a series-regulator with about the same efficiency as a series-regulator designed only for source loading. Thus, a minimum of power is wasted under all loading conditions. This circuit arrangement also has an improved response time in comparison to prior arrangements. With improved efficiency, the power dissipation is kept low so that a safe temperature can be maintained.

In a specific embodiment of the invention, the shunt-regulating device comprises a transistor having its emitter-collector path connected in series with a buffer resistor, and this combination is connected in shunt across the output terminals. The buffer resistor performs two functions. First, the voltage drop across the buffer resistor is directly proportional to the current through the shunt transistor, and; therefore, it provides a means of detecting this current to control the series-regulating device. Second, the buffer resistor dissipates some of the power which would otherwise be dissipated by the shunt transistor. Preferably, the shunt-regulating device and the series-regulating device each comprises a pair of transistors connected in a compound arrangement as disclosed in the Darlington U.S. Patent 2,663,806.

The above-mentioned and other objects and features of this invention and the manner of obtaining them will become more apparent and the invention itself will be best understood, by reference to the following description of an embodiment taken in conjunction with the accompanying drawings comprising FIGS. 1 to 4, wherein.

Figure 3:
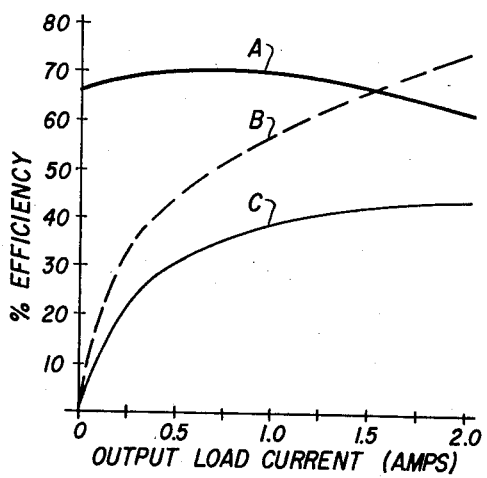

FIG. 3 comprises a set of curves which show the power supply efficiency; and

Figure 4:
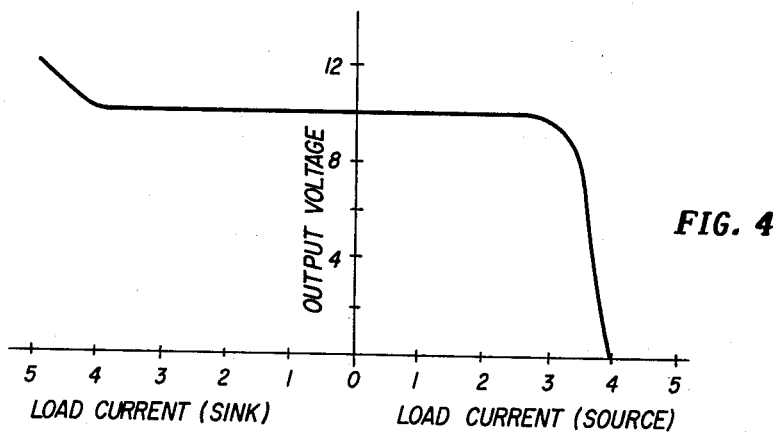

FIG. 4 is a curve showing the regulator output characteristic.

Figure 1:
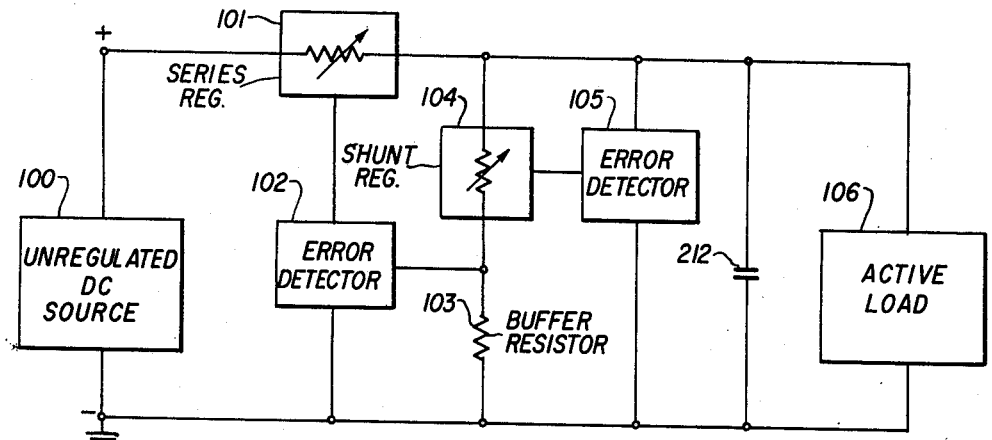
FIG. 1 is a block diagram of a voltage-regulating circuit embodying the invention.

Referring now to FIG. 1 of the drawings, there is shown a block diagram of apparatus for controlling the supply of power from a direct-current source 100 to an active load 106. The load 106 is of the type which may itself supply power back to its terminals, and; therefore, the controlling apparatus must be capable of acting as a sink for absorbing this power. The source 100 may have an unregulated output. However, the voltage across the load 106 must be accurately maintained at a given nominal value. The voltage-regulating arrangement connected between the source 100 and the load 106 is in a combined series-shunt regulating arrangement. One variable resistance device 101 is connected in series in the current path between the source 100 and the load 106; and another variable resistance device 104 in series with a buffer resistor 103 is connected in shunt across the load 106. An error detector 105 is provided for controlling the shunt device 104, in response to load voltage changes. According to a principal feature of the invention, the series device 101 is controlled in accordance with current flowing through the shunt device 104. This is accomplished by connecting the detector 102 across the buffer resistor 103 to control the variable resistance device 101. The buffer resistor 103, in addition to the function of providing means for detecting the current flowing through the shunt-regulating element, also has a function of dissipating some of the power which would otherwise be dissipated by the device 104.

Any voltage-regulating arrangement which is used in apparatus for supplying current from a source to a load includes a resistor connected in series in the current path between the source and the load. The function of this series resistor is to provide a controlled voltage drop. The voltage drop may be controlled either by varying the resistance of the series resistor or by varying the current flow through it. In the usual series regulator, the resistance of the series resistor is controlled and a fixed bleeder resistor is connected in shunt across the load. In the usual shunt-regulator, the value of the resistor shunted across the load is controlled to, thereby, control the current flow through the fixed series dropping resistor. However, in the arrangement disclosed here, both the series resistance and the shunt resistance are variable. Therefore, at no load, both of these resistance may be made to have relatively high values, so that only a small amount of current is drawn from the source 100. Under load conditions in which the load 106 draws current from the source 100, the voltage across the load terminals tends to drop. This voltage change is detected by the error detector 105 and causes the resistance of device 104 to be increased. This decreases the shunt current flow, and; thereby, decreases the voltage drop across the buffer resistor 103. The error detector 102 then causes the resistance of device 101 to be decreased. Under conditions which produce an increase of voltage at the load terminals, the detector 105 decreases the resistance of device 104, and thereby increases the current flow through the resistor 103; and in response thereto, the detector 102 increases the resistance of device 101. Therefore, the voltage at the load terminals is maintained at substantially the nominal value. The efficiency for source loading is as good as that obtained with a conventional series-regulator.

For sink loading, that is, under conditions in which the load 106 supplies power back to its terminals, the voltage at the terminals tends to rise. Then the detector 105 causes the resistance of the shunt-regulating device 104 to decrease. It should be noted that because of unidirectional circuit elements the sink power cannot flow through the series-regulating device 101 back into the source 100. The resistance of the shunt device 104 decreases to a value low enough to absorb all of the current from the load and still maintain the voltage at the load terminals at substantially its nominal value. The detector 102, in response to the high voltage across the buffer resistor 103, causes the resistance of the series device 101 to be increased to a very high value. Therefore, the current drawn from source 100 during sink loading is negligible. Thus, it may be seen that there has been provided a voltage-regulating arrangement such that low current is drawn from the source both at no load and at sink loading conditions. This is an advantage which has not been obtained with prior regulating arrangements.

Since the variable resistance device 101 has the function of keeping the current drawn from the source 100 at a minimum during no load and sink load, it may be referred to as an "idling current limiter."

The following facts concerning the sink-source regulator according to the invention are summarized in order to fully comprehend the improvement in operating efficiency. When there is no loading at the output terminals of the regulator, very little power is wasted since the no load idling current is appreciably smaller than in the previous regulators. The power wasted for source loading is the same as at the no load condition. When sink loading is applied to the output terminals of the regulator, there is a negligible amount of current drawn from the unregulated direct-current source which implies a negligible amount of power wasted.

For a more concrete comparison of the regulator according to the invention with the principal prior art types used for sink loading, let us assume for example a ten-volt power supply capable of delivering one ampere of power as a power source or absorbing one ampere as a power sink. Table I shows this comparison of the two principal types of prior art regulators and the sink-source regulator according to the invention. The prior art types are the series-regulator with a bleeder resistor and a shunt-regulator. This table shows the amount of idling current drawn from the source at no load and the amount of power wasted at no load, full source load, and full sink load.

TABLE I

| Regulator Type | Idling Current | Power Wasted | | |
|---|---|---|---|---|
| | | No Load w. | Full Source Load, w. | Full Sink Load, w. |
| Series with bleeder resistor | 1 amp | 10 | 10 | 0 |
| Shunt | 1 amp | 10 | 0 | 10 |
| Sink-Source | 200 ma | 2 | 2 | 0 |

Figure 2:
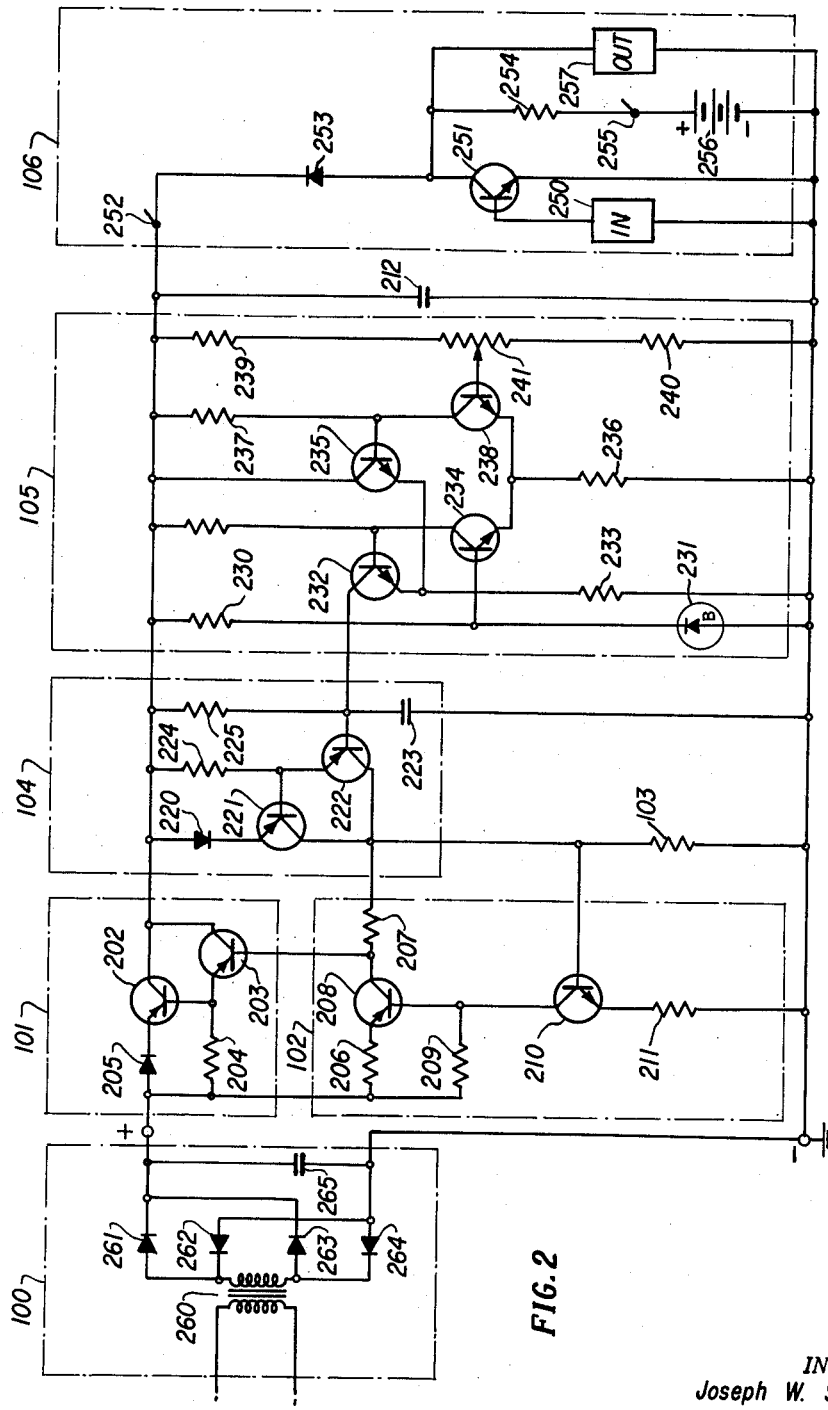
FIG. 2 is a schematic diagram of the voltage-regulating circuit of FIG. 1.

FIG. 2 is a schematic diagram of a specific embodiment of the arrangement of FIG. 1.

The unregulated direct-current power source 100 is comprised of a transformer 260 for coupling the alternating-current input to a rectifier arrangement having diodes 261, 262, 263, and 264 connected to its secondary windings. A filter capacitor 265 is shunted across the rectifier output.

The series-regulating device 101 comprises transistors 202 and 203 in a Darlington compound connection. A diode 205 is connected to the emitter of transistor 202 of the Darlington compound connection. This diode 205 provides a fairly constant voltage drop regardless of possible wide variations in load current.

The shunt-regulating device 104 comprises transistors 221 and 222 in a Darlington compound connection. The base of transistor 221 is connected to the emitter of transistor 222. The emitter of transistor 221 is connected through a diode 220 to the positive output terminal of the load. The diode 220 connected to the emitter of transistor 221 provides a fairly constant voltage drop regardless of possible wide variations in load current. Resistor 224 connected to the positive output terminal of the load is also connected to the base of transistor 221. This resistor 224 provides back bias for the power transistor 221 in the shunt-regulating device 104. Another resistor 225 is connected between the positive load terminal and the base of transistor 222 which provides a back bias before breakdown occurs. A capacitor 223 is shunted from ground to the base of transistor 222. The capacitor 223 suppresses oscillations during breakdown. This oscillation is caused by a thermally-initiated negative resistance. The collectors of transistors 221 and 222 are connected together. The buffer resistor 103 is connected between the collectors of transistors 221 and 222 and the other output terminal of the load.

A capacitor 212 connected across the load minimizes any change in the output voltage due to transient effects.

The error detector 105 comprises two cascaded long-tailed pair transistor configurations in a voltage comparison circuit. The first of these long-tailed pairs consists of two small signal transistors 234 and 238 which have their emitters tied to a common point through a resistor 236 to ground. A voltage-divider comprising in series a resistor 239, a potentiometer 241, and a resistor 240 is connected across the load 106. The base of transistor 238 is connected to the variable tap of the potentiometer 241. There is also connected across the load a current path comprising in series a resistor 230 and a constant voltage p-n junction diode 231 poled so that current from the source 100 flows through it in the inverse or high resistance direction. The base of transistor 234 is connected to the common terminal of diode 231 and resistor 230. For any deviation from the preset voltage, the bases will be at different potentials. The common potential of the emitter will be at some other value between the potentials of the bases. Therefore, in the event the input voltage deviates, one transistor will tend to turn on and the other will tend to turn off.

The second cascaded long-tailed pair also consists of two small signal transistors 232 and 235 with their emitters tied to a common point through a resistor 233 to ground. The base of transistor 232 is connected to the collector of transistor 234, and the base of transistor 235 is connected to the collector of transistor 238. In this manner, the difference in the collector-to-emitter voltage drops of the first comparison unit, composed of transistors 234 and 238, is detected, and the error is amplified by the second comparison unit, composed of transistors 232 and 235. This amplified error is sent to the shunt device 104.

The detector 102 comprises a transistor 210 which has its emitter connected through a resistor 211 to the negative output terminal. The base of transistor 210 is connected to the junction of the buffer resistor 103 and the collectors of transistors 221 and 222. The collector of transistor 210 is connected to the base of transistor 208. The base of transistor 203 is connected to the collector of transistor 208, which has a resistor 206 connected to its emitter and resistor 207 connected to its collector. The transistor 208 acts as a variable resistance, giving the network with resistors 206 and 207 a voltage-divider effect.

Operation of this circuit may be analyzed as follows: Any deviation in output voltage across the output terminals is detected by the voltage-divider arrangement comprising in series resistor 239, potentiometer 241, and resistor 240 connected directly across the load. This deviation is further detected by the sensing transistors 238 and 234 which are capable of detecting errors in the output voltage as small as a five millivolt change. This error is first amplified by the transistors 235 and 232 which have their bases connected to the collectors of transistors 238 and 234, respectively. This amplified error is sent to the shunt device 104. The error is sent from the collector of transistor 232 to the base of transistor 222 of device 104.

The resistance of transistors 221 and 222 in device 104 is varied in accordance with the signal received from the collector of transistor 232. This produces a variation of the current flowing through device 104 and resistor 103. Therefore, the voltage drop across resistor 103 varies in direct proportion to the shunt current flow through device 104.

If the voltage across the buffer resistor 103 increases, (as a result of an increase of load voltage) the transistor 210 draws more current from the base of transistor 208 tending to decrease its collector-to-emitter resistance. This produces a large reverse bias on the Darlington compound connection of transistors 202 and 203. The resistance of the series-regulating device accordingly is increased. If the shunt-regulating element 104 should tend toward cut off (as a result of a decrease of load voltage), the voltage across the transistor 221 will increase, and this will place a large forward bias on transistors 202 and 203 through resistor 207. The resistance of the series device 101 will then be reduced. Therefore, for any voltage deviation from the nominal value, the circuit will automatically adjust itself.

The following is a summarization of data taken during test of a supply according to FIG. 2, capable of delivering two amperes as a source or accepting two amperes as a sink.

Transient regulation from no load to full source load _____ % __ 2.4
Static regulation from no load to full source load (approximately) _____ do __ 0
Transient response time (source) __ micro-seconds __ 200
Transient regulation from no load to full sink load _____ % __ 1.4
Static regulation from no load to full sink load (approximately) _____ do __ 0
Transient response time (sink) ____ micro-seconds __ 100
Output ripple at full source load (less than) _____ millivolt __ .2
No load idling current _____ milliamperes __ 180

Referring now to FIG. 3, there are shown three efficiency curves for source loading. The abcissa of the graph is the output load current of the regulator, and the ordinate is the efficiency.

The first curve A is the efficiency of the rectifier-filter circuit based on the alternating-current input power and the direct-current output power of the filter circuit.

The second curve B is the efficiency of the regulator circuit based on the direct-current output power of the filter circuit and the direct-current output power of the regulator.

The third curve C is the overall efficiency of both circuits.

The rectifier filter efficiency does not drop to zero at zero output load current, since it is supplying the no-load idling current. The overall efficiency at full source load is 43.3% which would be a typical figure for a source regulator under the same conditions.

FIG. 4 is a plot of the sink-source regulator output characteristics. For source loading, the output voltage is maintained at a constant 10 volts up to approximately 2.3 amperes. At high source currents, the output voltage breaks down, and when the output is short-circuited a current of about 4 amperes will flow. For sink loading, the regulator will accept current as large as 4 amperes at a constant output voltage. Any currents larger than 4 amperes will cause the output voltage to rise as shown on the graph of FIG. 4.

The load 106 shown in FIG. 2 is representative of the type for which the regulator has been designed. In electronic switching systems, transistors are used as switching elements in many circuits, such as in flip-flops, in certain types of logical gates, in inverter amplifiers, and other such circuits. In the load 106 of FIG. 2 a transistor 251 is shown in a typical switching circuit. In the circuit shown here, the true or "1" signal is a positive potential, and the false or "0" signal is negative potential. The block 250 represents a similar preceding switching stage or other source of digital signals; and the block 257 represents a subsequent switching stage or other load. The principal direct-current voltage supply for the switching transistor is supplied from the positive terminal 255 of the direct-current source 256. The collector electrode of transistor 251 is connected through a bias resistor 254 to terminal 255, to the output 257, and through a clamping diode 253 to the terminal 252. If the output signal supplied from unit 250 to the base electrode of transistor 251 is true, the positive potential biases the transistor 251 into saturation and thereby brings its collector electrode to ground potential. Therefore, the output signal to unit 257 is false. In its condition, the clamping diode 253 is reverse biased and no current is drawn from the supply 100. When the input signal to the base electrode of transistor 251 becomes false, the ground potential biases the transistor through cut-off. Current is then drawn from source 256 to resistor 254 and supplied to the output 257. To provide a fast rise time, the potential of source 256 is made substantially greater than the desired output value, and the collector electrode of transistor 251 is clamped to diode 253 to a separate source 100 at the desired potential. The voltage of source 256 may be high enough to damage the transistor 251. Therefore, it is important that whenever the source 256 is on, that the clamping voltage at terminal 252 is also supplied and not be permitted to exceed a designated value. The supply 100 may be connected in multiple at terminal 252 to several clamping diodes of individual transistor switches.

It is thus clear that any one of the transistors 251 which is biased to cut-off is supplying power through its clamping diode 253 to terminal 252 at the source 100. A sink must be provided to absorb this power. According to the invention, this sink is provided by the transistor 221 in the regulating element 104. The power flowing from the terminal 252 causes the voltage to rise, which in turn causes the regulator to lower the resistance of the transistor 221, thereby reducing the voltage drop through the buffer resistor 103 and through the transistor 221.

When there is no load at terminal 252 to ground, or power is being drawn from the source 100, and the voltage is at the correct nominal value, negligible power is drawn by the unit 104. Therefore, the efficiency under these conditions is very good.

It may happen in some instances involving a load 106, such as shown in FIG. 2, that a regulated direct-current power supply at the correct voltage is already available, but that the supply is capable only for operation with source loading. If the supply is series-regulated, it is of course possible to add a bleeder resistor to provide for sink loading. However, as already pointed out, that is not a desirable solution.

A good solution is to use the shunt-regulator portion of the arrangement disclosed herein, shunted across the load terminals. This comprises the variable resistance device 104 in series with the buffer resistor 103 across the load terminals, and controlled by the error detector 105, in the same manner as shown in FIGS. 1 and 2 and described above. This arrangement provides an efficient sink for power supplied back from the load, and protects the load from over voltage.

It is a feature of the invention that the arrangement comprising device 104, resistor 103, and the error detector 105 is completely independent of any voltage sources other than that appearing at the terminals of the load 106. That is, no bias supplies are required. This represents a great advantage, since the voltage at the load terminals can be prevented from exceeding the nominal value, without dependance on any power supply, including the regulated source.

While we have described above the principles of our invention in connection with specific apparatus, it is to be clearly understood that this description is made only by way of example and not as a limitation to the scope of our invention.

What is claimed is:

1. In combination with a utilization circuit arrangement having a pair of terminals coupled to a first direct-current supply source, with means included in the utilization circuit arrangement to selectively couple a second direct-current supply source to said terminals by way of circuit elements, with the poles of like polarity of the two said direct-current supply sources coupled respectively to the same terminals of said pair, the second direct-current supply source having a potential greater than that of the first direct-current supply source, there being effectively a high series impedance on the first-supply-source side of said terminals to current flowing in a reverse direction corresponding to a transfer of power from the second direct-current supply source toward the first direct-current supply source so that in response to the coupling by the utilization circuit arrangement of the second direct-current supply source to said terminals the potential at said terminals tends to rise above said nominal value;

apparatus comprising first variable impedance means connected in shunt directly across said terminals, and first control means including an amplifying arrangement connected to sense the shunt potential across said terminals and supply a control signal to the first variable impedance means;

second variable impedance means connected in series between the first direct-current supply source and the first variable impedance means, at least a part of said high series impedance to reverse current flow on the first supply source side of said terminals being that produced by said second variable impedance means, second control means including an amplifying arrangement connected to sense the current through the first variable impedance means and to supply a control signal to the second variable impedance means;

the only control sensing means between said first direct-current supply source and said terminals being elements in circuits connected in shunt across said terminals;

the apparatus being so constructed and arranged that with a zero value of load current both the first and the second variable impedance means have a relatively high impedance so that a small value of current flows through them, that in response to increasing load current flowing in the forward direction which tends to decrease the potential across said terminals the impedance of the first variable impedance means is increased so that the current flowing through it and detected by the second control means is decreased and in response thereto the impedance of the second variable impedance means is decreased, and that in response to a voltage greater than said given value at said terminals the impedance of the first variable impedance means is reduced to thereby absorb power and to decrease the potential at said terminals toward said nominal value, irrespective of whether the cause of the voltage rise and the source of the power is the first supply source, or the utilization circuit arrangement has coupled the second supply source to cause the current to reverse and the power to flow from the second supply source through said circuit elements to said terminals, the impedance of the second variable impedance means being increased in response to the increased current flow through the first variable impedance means.

2. The combination as claimed in claim 1, wherein said first variable impedance means comprises an emitter-collector path of a transistor device in series with a buffer resistor connected across said terminals, with a base electrode of the first transistor device connected via a control connection to said first control means;

and wherein said second variable impedance means comprises an emitter-collector path of a second transistor device, with a base electrode of the second transistor device connected via a control connection from said second control means;

and wherein said connection of the second control means to sense the current through the first variable impedance means comprises an arrangement to sense the potential across said buffer resistor.

3. The combination as claimed in claim 2, which further includes a capacitor connected between said load terminals in shunt of said first impedance means;

and wherein said means and circuit elements included in the utilization circuit arrangement to selectively couple the second direct-current supply source to said terminals includes a clamping diode with a given point of the utilization circuit arrangement connected through said diode to a first one of said terminals, said diode being poled to be forward biased when the potential at said given point is greater than that of said first terminal with respect to the other one of said terminals, said first terminal being coupled to the pole of a given polarity of the first direct-current supply source; a load resistor connecting the pole of said given polarity of the second direct-current supply source to said given point; a load transistor having collector, base and emitter electrodes, with the collector electrode connected to said given point, the emitter electrode connected to said other terminal, and the base electrode connected to a control source, so constructed and arranged that the transistor varies between a low impedance value to effectively shunt said given point to said other terminal and a high impedance value; whereby with said load transistor at said high impedance value the second direct-current supply source is coupled to said terminals by way of said load resistor and diode to produce the current flowing in a reverse direction corresponding to a transfer of power from the second direct-current supply source toward the first direct-current supply source.

4. The combination as claimed in claim 2, wherein said connection of the first variable impedance means to the said load terminals comprises a connection from a first of said terminals through said first transistor device to a junction point and thence through said buffer resistor to a second of said terminals, and wherein said second variable impedance means is connected between the first direct-current supply source and the first terminal;

and wherein said second control means includes a voltage divider having a resistor connected between said junction point and the control connection to said second transistor device, and a transistor having emitter, base and collector electrodes with its collector electrode connected to the control connection of the second transistor device and its emitter and base electrodes connected through respective resistors to the point connecting the second variable impedance means to the first direct-current supply source;

and means for supplying an input signal to the base electrode of the last mentioned transistor comprising another transistor having emitter, base and collector electrodes, with said signal obtained from the collector electrode and with the base electrode connected to said junction point and the emitter electrode connected through a resistor to said second load terminal.

5. In combination with a utilization circuit arrangement having a pair of terminals coupled to a first direct-current supply source, with means included in the utilization circuit arrangement to selectively couple a second direct-current supply source to said terminals by way of circuit elements, with the poles of like polarity of the two said direct-current supply sources coupled respectively to the same terminals of said pair, the second direct-current supply source having a potential greater than that of the first direct-current supply source, there being effectively a high series impedance on the first-supply-source side of said terminals to current flowing in a reverse direction corresponding to a transfer of power from the second direct-current supply source toward the first direct-current supply source so that in response to the coupling by the utilization circuit arrangement of the second direct-current supply source to said terminals the potential at said terminals tends to rise above said nominal value;

apparatus comprising variable impedance means connected in shunt across said terminals, and control means connected to sense the shunt potential across said terminals and in response to an increase in said potential above said nominal value to supply a control signal to reduce the impedance of the first variable impedance means, thereby to absorb power and to decrease the potential at said terminals towards said nominal value, irrespective of whether the cause of the potential rise and the source of the power is the first supply source, or the utilization circuit arrangement has coupled the second supply source to cause the current to reverse and power to flow from the second supply source through said circuit elements to said terminals; the only control sensing means between said first direct-current supply source and said terminals being elements in circuits connected in shunt across said terminals;

said control means being so constructed and arranged that the only source of voltage supplied thereto is that at said load terminals.

6. Apparatus according to claim 2, wherein said first control means comprises a pair of transistors each having emitter, base, and collector electrodes, a Wheatstone bridge having its four arms interconnecting the two load terminals and the base electrodes of the two transistors, one of the arms being a voltage reference device, connections from the collector electrode of the two transistors through respective transistors to one of the load terminals, and a common connection from the emitter electrodes of the two transistors through a resistor to the other load terminal, and circuit means coupling the collector electrode of one of the transistors to the said first variable impedance means, to vary the first impedance means in response to voltage variations between said load terminals.

7. Apparatus according to claim 6, wherein said first control means further includes a second pair of transistors each having emitter, base, and collector electrodes, the base electrode of each transistor of the second pair being connected to the collector electrode of respective ones of the transistors of the first pair, a connection in common from the emitter electrodes of the transistors of the second pair through a resistor to said other load terminal, and a connection from the collector electrode of each transistor of the second pair to the said one load terminal, the connection from said first control means to the first impedance means being from the collector electrode of one of the transistors of the second pair.

References Cited in the file of this patent

UNITED STATES PATENTS 2,912,638 McNamee _____ Nov. 10, 1959
2,917,700 Chase _____ Dec. 15, 1959

OTHER REFERENCES

Publication: Electronics, Sept. 23, 1950, pages 62–65.